United States Patent [19]

Handke et al.

[11] Patent Number: 5,893,435
[45] Date of Patent: Apr. 13, 1999

[54] VIBRATION DAMPER FOR A MOTOR VEHICLE, THE VIBRATION DAMPER HAVING A DECOMPRESSION STOP BOUNDARY BRACKET

[75] Inventors: Günther Handke, Euerbach; Andreas Zietsch, Röthlein; Michael Hurrlein, Hammelburg, all of Germany

[73] Assignee: Fichtel & Sachs AG, Schweinfurt, Germany

[21] Appl. No.: 08/770,244

[22] Filed: Dec. 20, 1996

[30] Foreign Application Priority Data

Dec. 20, 1995 [DE] Germany .................. 195 47 591

[51] Int. Cl.⁶ .................................................. F16F 9/00
[52] U.S. Cl. .................. 188/321.11; 280/96.1; 280/668
[58] Field of Search .............. 188/321.11, 322.12, 188/322.19; 280/668, 96.1, 696, 701; 248/230

[56] References Cited

U.S. PATENT DOCUMENTS

| | | | |
|---|---|---|---|
| 4,261,446 | 4/1981 | Bolger | 188/321.11 |
| 4,363,436 | 12/1982 | Evans et al. | 72/379 |
| 5,170,973 | 12/1992 | Ohta | 280/668 X |
| 5,180,129 | 1/1993 | Yamaoka et al. | 280/668 X |
| 5,228,717 | 7/1993 | Perkins | 280/668 |
| 5,277,357 | 1/1994 | Miyamoto et al. | 72/379.2 |
| 5,308,032 | 5/1994 | Ohta | 280/668 |
| 5,350,044 | 9/1994 | Gelhausen | 188/322.12 |
| 5,401,051 | 3/1995 | Ivory | 280/668 |
| 5,423,403 | 6/1995 | Handke et al. | 280/668 |
| 5,622,242 | 4/1997 | Handke et al. | 188/321.11 |

FOREIGN PATENT DOCUMENTS

| | | |
|---|---|---|
| 0029289 | 5/1981 | European Pat. Off. |
| 0497857 | 8/1992 | European Pat. Off. |
| 2299982 | 9/1976 | France . |
| 8506529 | 6/1985 | Germany . |
| 4321036 | 1/1995 | Germany . |
| 2279598 | 1/1995 | United Kingdom . |
| 9106438 | 5/1991 | WIPO . |

OTHER PUBLICATIONS

Umformen und Zerteilen (Forming and Splitting), Handbuch der Fertigungstechnik (Production Engineering Handbook), vol. 2B, Munich Vienna: Carl Hanser Verlag (Publishing House), 1985, p. 1331, SPUR, Günter [Editor].

*Primary Examiner*—Peter M. Poon
*Assistant Examiner*—Pamela J. Lipka
*Attorney, Agent, or Firm*—Nils H. Ljungman & Associates

[57] ABSTRACT

Vibration damper, in particular a shock absorbing strut, with an essentially U-shaped decompression stop boundary bracket, which bracket is fastened to a container tube, and in the event of a rebound of a vehicle axle comes into contact with a chassis-side support surface. The bracket includes a base plate with side walls, and the entire decompression stop boundary bracket is formed from a single bent component. The base plate is realized in a seamless manner and has a cutout which is adapted to the diameter of the container tube and acts as a positioning stop for the entire decompression stop boundary bracket.

20 Claims, 8 Drawing Sheets

VIBRATION DAMPER FOR A MOTOR VEHICLE, THE VIBRATION DAMPER HAVING A DECOMPRESSION STOP BOUNDARY BRACKET

BACKGROUND OF THE INVENTION

1. Field of the Invention

The present invention generally relates to a vibration damper, in particular a shock absorbing strut. The vibration damper can have an essentially U-shaped decompression stop boundary bracket, which bracket is fastened to a container tube, and in the event of a rebound of a vehicle axle, the bracket can come into contact with a chassis-side support surface. The bracket can include a base plate with side walls, and the entire bracket can be formed by bending a single component.

2. Background Information

WO 91/06438 describes a shock absorbing strut which, on its container tube, has a decompression stop boundary bracket which comes into contact with a chassis-side support surface when the vehicle axle has reached its maximum rebound position. The decompression stop boundary bracket includes a base plate and a reinforcement plate as well as a radial guide plate, whereby the base plate is welded to the reinforcement plate and to the guide plate. In accordance with this realization, a spot welding process is used between the base plate and the guide plate, while an inert gas arc welding process is employed to lay down the seam between the reinforcement plate and the base plate.

German Laid Open Patent Application No. 43 21 036 also describes a decompression stop boundary bracket, in which the reinforcement plate is connected by means of seams laid down by inert gas arc welding. As a result of the use of this technology, undesirable weld spatters can occur which are difficult to remove due to the configuration of the component. Even when the component is realized in one piece, there are weld seams which have to be reworked.

An additional problem relates to the positioning of the decompression stop boundary bracket in relation to the vibration damper. When there is a specified rebound travel, the decompression stop boundary bracket must be supported over a specified portion, either on the vehicle axle or on the vehicle body. It is therefore particularly important to maintain the position of the decompression stop boundary bracket. In the realizations described in German Laid Open Patent Application No. 43 21 036, the positioning function is performed by a guide part which is realized in the form of a bent component. Even small differences in the bending radius can have a significant effect on the position of the decompression stop boundary bracket. For example, if the radius of the guide part is too small, the decompression stop boundary bracket is displaced, forming a gap relative to the container tube, so that it is essentially impossible to maintain the specified position.

OBJECT OF THE INVENTION

The object of the present invention is to eliminate the disadvantages of similar devices while maintaining or increasing the load limit of the decompression stop boundary bracket.

SUMMARY OF THE INVENTION

The present invention teaches that this object can be accomplished by realizing the base plate of the bracket in a seamless manner with a cutout, which cutout is adapted to the diameter of the container tube.

The seamless base plate can make a connecting weld seam unnecessary. Consequently, it is possible to bypass the problems of the weld seam reworking mentioned above. A cutout, in particular if it is stamped or punched, can be manufactured easily and economically with great accuracy. The effects of manufacturing tolerances can be considered negligible.

The invention also teaches that the base plate, when it is in the form of a blank, has a projecting portion, with respect to the side walls, and which runs in the direction of the longitudinal axis of the decompression stop bracket, which projecting portion is deformed in the finished part so that the projecting portion begins at the base plate and extends between the side walls. When a load is applied, the projecting portion of the base plate is clamped between the side walls, and has the effect of significantly reinforcing the overall decompression stop boundary bracket, although no additional welding has been realized between the projection and the side walls. The entire manufacturing process of the component can essentially be restricted to cutting and bending steps during fabrication, and requires practically no reworking.

The present invention also teaches that, in accordance with one embodiment, there can advantageously be a positive connection between the projecting portion and the side walls. Even in the event of the most unfavorable introduction of force, the support function of the projecting portion can essentially be guaranteed. The positive connection can preferably be formed by a notch in the one connecting part and a corresponding tab in the other connecting part. The present invention teaches that it can be particularly advantageous if one part of the positive connection is realized in the end surface of the ends of the side walls, which ends lie in the axial direction. For the tab or tabs, no special lead-in stampings need to be introduced into the side walls. If the fabrication starts with a U-shaped component, the projecting portion of which is to be deformed between the side walls, it can be advantageous if the tab is a component of the projecting portion and the notch is located in a side wall, because in that case, a lock between the notch and the tab can be created during the deformation of the projecting portion at a very small bending angle.

To minimize the length of the lever for the force being applied, the projecting portion of the base plate can be realized on the end opposite the container tube.

In addition, the base plate has a stop plate which is also a component of the one-piece decompression stop boundary bracket. This stop plate can essentially guarantee the correct orientation of the decompression stop boundary bracket, so that after the bracket is placed in a welding jig, the bracket is essentially automatically in a stable position on the container tube.

For ease of handling of the decompression stop boundary bracket during the fabrication process, in accordance with one embodiment, the stop plate, beginning from the base plate, can be realized so that it is longer than the projecting portion between the side walls. Clamping tools which are used, for example, during the welding of the decompression stop boundary bracket to the container tube, can be applied to this specially designed projecting portion.

The present invention teaches that the stability of the assembly can be improved if the entire decompression stop boundary bracket is realized in the form of a bent component which contains flow holes. In that case, there are no welds or creases, because the entire component is manufactured from one piece of sheet metal using the appropriate bending tools. To get the openings, the purpose of which is to permit the discharge of fluid from the decompression stop boundary bracket, there are free stampings for the deformation of the decompression stop boundary bracket, which stampings are realized outside a transition radius which connects the base plate, the side walls and the projecting portion. Measures can be taken to reliably prevent the stampings from closing during the transformation process, or at least to prevent any significant reduction of their cross section.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the accompanying figures, in which.

DESCRIPTION OF THE PREFERRED EMBODIMENT

Figure 1:
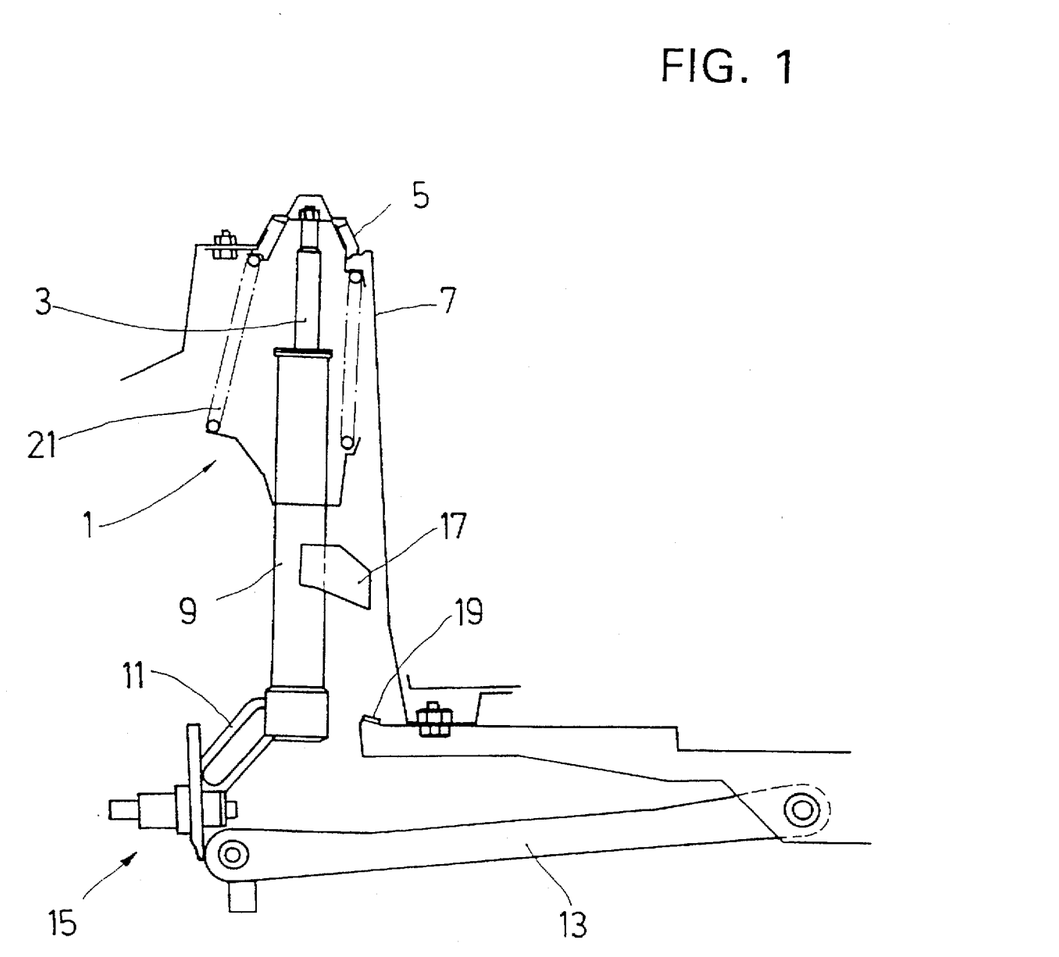
FIG. 1 shows a vehicle vibration damper installation with a decompression stop boundary bracket.

FIG. 1 shows a known shock absorber or vibration damper installation. A vibration damper 1, in this case a shock absorbing strut, is connected by means of a piston rod 3 to a support bearing 5 of a vehicle chassis 7. A container tube 9 has a wheel mounting 11, which wheel mounting 11 is in turn connected to a suspension arm 13. The suspension arm 13 is a component of a vehicle axle 15.

Figure 1A:
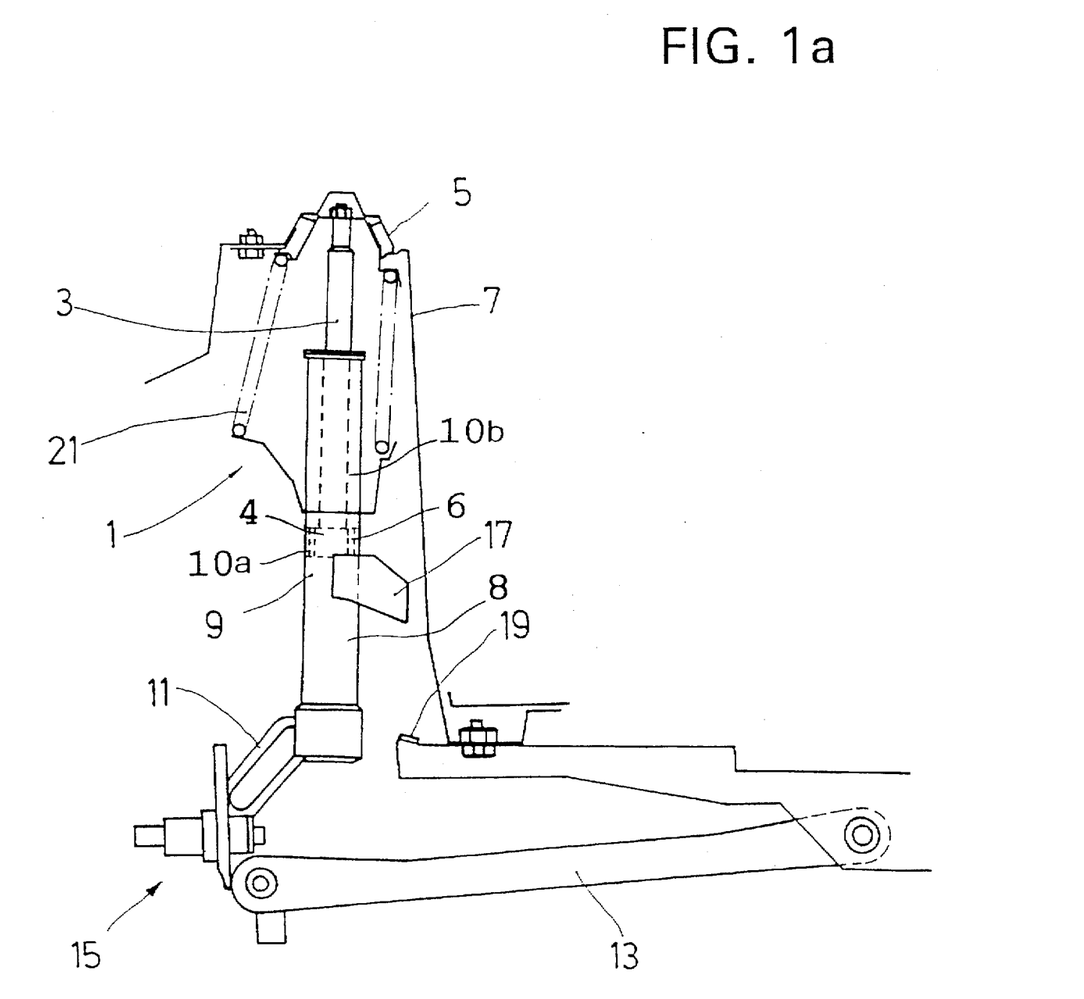
FIG. 1a shows essentially the same view as FIG. 1, but shows additional components.

FIG. 1a shows essentially the same view as FIG. 1, but includes additional components (shown schematically) of a typical vibration damper assembly. In accordance with one embodiment, there can preferably be a piston 4 attached to one end of the piston rod 3, which piston 4 can sealingly divide the interior portion of the container tube 9 into a first or upper working chamber 6 and a second or lower working chamber 8. The piston 4 can also include a valve or valves 10a, 10b, which valve 10a,10b regulates fluid flow between the first and second working chambers 6, 8.

The container tube 9 also has a decompression stop boundary bracket 17, which decompression stop boundary bracket 17 can come into contact with a chassis-side support surface 19 when the maximum rebound position of the vehicle axle has been reached, for example, when the vehicle is jacked up. In this rebound position of the vehicle axle 15, large bending moments which result from the weight of the vehicle axle 15 and the additional spring force of a vehicle suspension spring 21 are applied to the connection between the container tube 9 and the decompression stop boundary bracket 17.

Figure 2A:
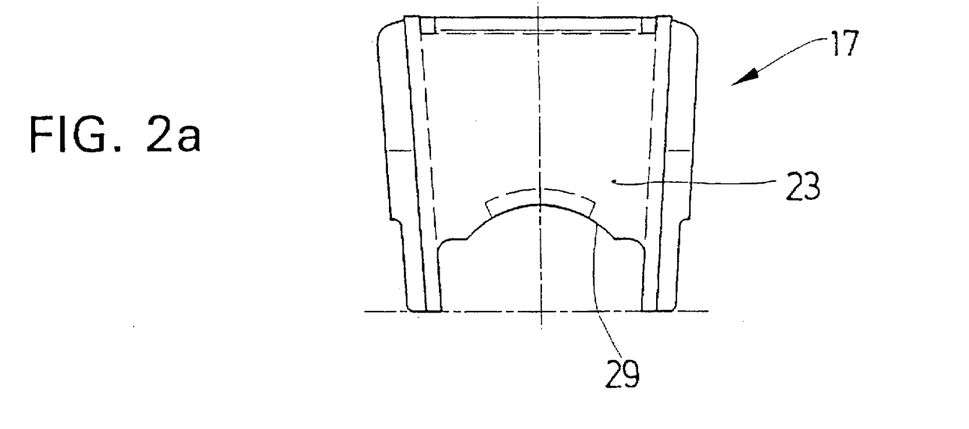
FIGS. 2a, 2b and 2c show one embodiment of the decompression stop boundary bracket in isolation.
Figure 2B:
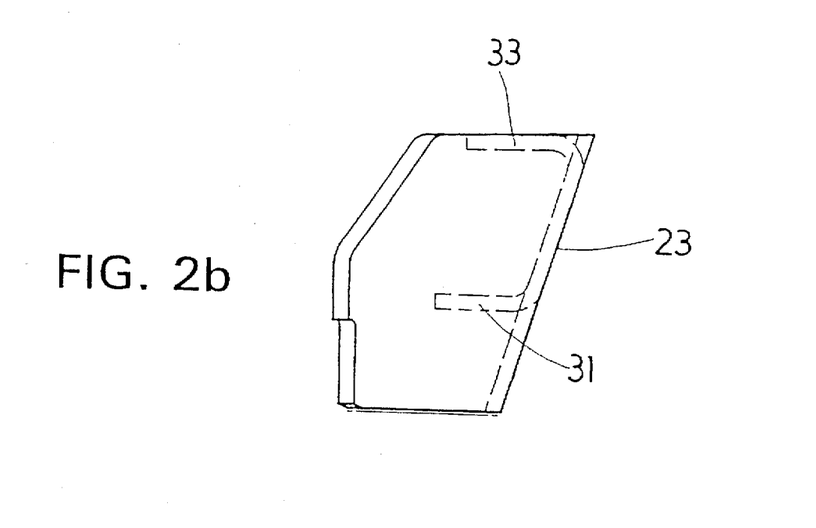
Figure 2C:
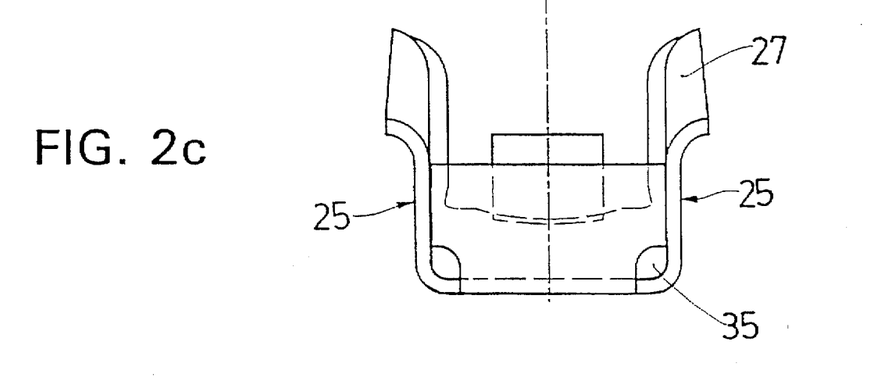

FIGS. 2a, 2b and 2c illustrate one embodiment of the decompression stop boundary bracket 17 in isolation. In accordance with one embodiment, FIG. 2a can be considered to show a bottom view of the bracket 17, FIG. 2b can be considered to show a side view, and FIG. 2c can be considered to be a frontal view of the bracket 17. The decompression stop boundary bracket 17 can preferably include a base plate 23 which, together with side walls 25, forms a generally U-shaped profile. For reinforcement, the ends of the side walls 25, which ends extend essentially parallel to the longitudinal axis, can be bent into collars 27.

The base plate 23 has a cutout 29 for the container tube 9 of the vibration damper 1. The cutout 29 can preferably act as a positioning stop on the container tube 9. For a welding connection between the decompression stop boundary bracket 17 and the container tube 9, the side walls 25 can be provided with fastening tabs.

Figure 2D:
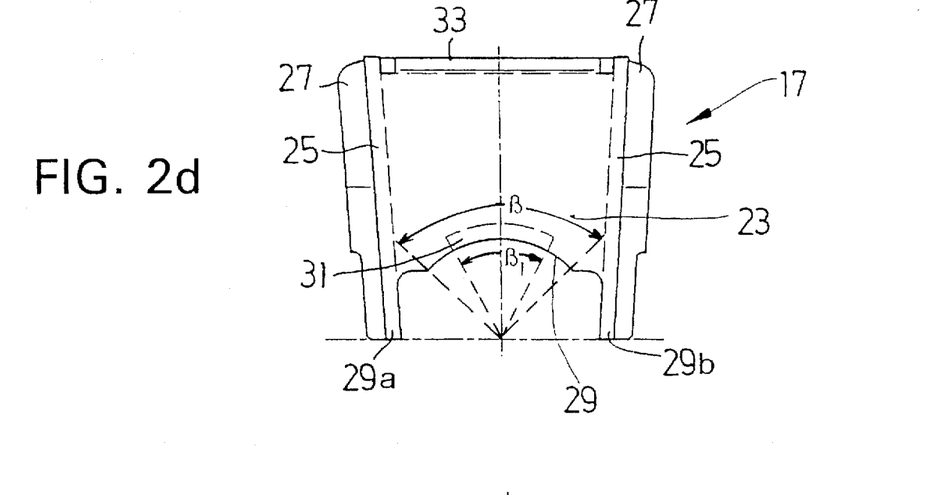
FIGS. 2d, 2e and 2f show similar views as that shown in FIGS. 2a-2c.

In accordance with one embodiment of the present invention shown in FIG. 2d, the aforementioned fastening tabs can be considered to be represented by the reference numbers 29a and 29b shown in FIG. 2d. Further, in accordance with one embodiment, the cutout 29 can preferably be adapted to the curvature of the exterior surface of the container tube 9, so that the bracket 17 can be positioned tightly against the container tube 9 without any gaps between the two components, at least during assembly. Once the bracket 17 has been positioned against the container tube 9, the tabs 29a, 29b can be welded to the container tube 9. Due to the configuration of the bracket 17 in accordance with the present invention, the welding of the tabs 29a, 29b to the container tube 9 can be done in an area adjacent the exterior of the bracket 17, which can prevent weld splatters from reaching the inside of the bracket 17. In accordance with one embodiment, if any gaps were to be formed between the bracket 17 and the container tube 9, the gaps could possibly be on the order of about 0.03 mm, 0.04 mm, 0.05 mm, 0.06 mm, 0.07 mm, 0.08 mm, 0.09 mm, 0.1 mm, 0.2 mm, 0.3 mm, 0.4 mm, or 0.5 mm, with regard to stamping tolerances, that is, tolerances which are close stamping tolerances. In accordance with alternative embodiments, the above-discussed gaps may be greater or less than the values given above. Any gaps formed between the container tube 9 and the bracket 17 can be considered undesirable, as they can cause the position of the bracket 17 with respect to the container tube 9 to shift, at least during assembly or welding of the bracket 17 to the container tube 9. This shift in position of the bracket 17 during assembly can result in an undesirable positioning of the bracket 17 on the container tube 9, and could cause the base plate 23 to contact or slam against the support surface 19 at an undesirable angle which could cause the bracket 17 to buckle, deform, or even detach from the container tube 9. In other words, the base plate 23 should preferably be essentially parallel with respect to the support surface 19 to prevent undesirable stresses in the material of the bracket 17.

The side view of the bracket 17 of FIG. 2b shows a stop plate 31, which stop plate 31 can be formed out of the base plate 23. The stop plate 31 can essentially guarantee the correct angular position of the decompression stop boundary bracket 17 in relation to the longitudinal axis of the vibration damper 1. On the end of the base plate 23 opposite the container tube 9, a projecting portion 33 of the base plate 23 can also be formed, and the projecting portion 33 can extend between the side walls 25. The interior surfaces of the side walls 25 are engaged with the end surfaces of the projecting portion 33, which side walls 25 can extend essentially parallel to the longitudinal axis of the decompression stop 17, so that when a load is applied, the side walls 25 and the projecting portion 33 support one another by means of their contacting surfaces. For the deformation of the projecting portion 33, free stampings can be introduced into the base plate 23, which free stampings are somewhat larger than would be necessary for the actual deformation process. The openings 35 which are formed in this manner, that is, as a result of stamping, can act as a discharge for moisture or fluid during the operation of the vibration damper 1 in the vehicle.

In accordance with one embodiment of the present invention, the stop plate 31 can preferably make contact with the outer surface of the container tube 9, and can thus serve as a guide for the correct positioning of the bracket 17 with respect to the container tube 9. In addition, the stop plate 31 can have a curved shape which essentially matches the cutout 29 and the exterior surface of the container tube 9.

The stop plate 31, in relation to the base plate 23, in accordance with one embodiment, can be longer than the projecting portion 33. The stop plate 31 can thereby present a clamping surface for the application of a clamping tool in a welding jig, in which jig the decompression stop boundary bracket 17 is welded to the vibration damper 1.

Figure 2E:
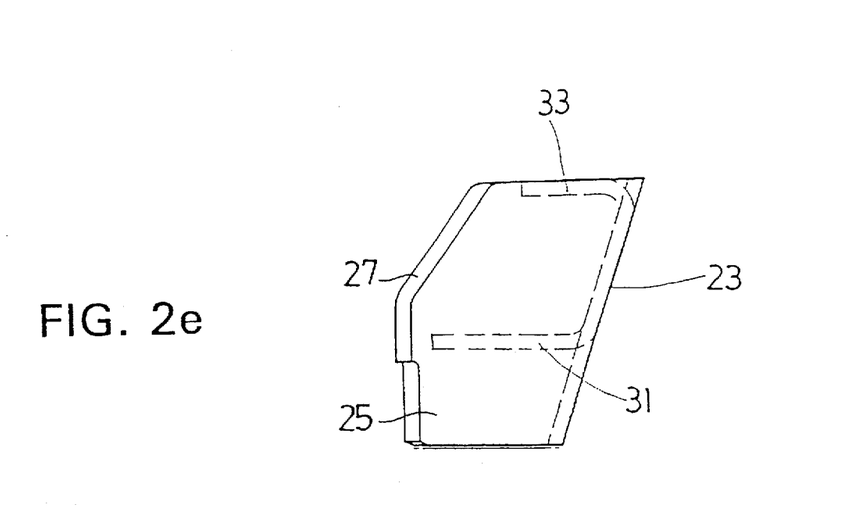
Figure 2F:
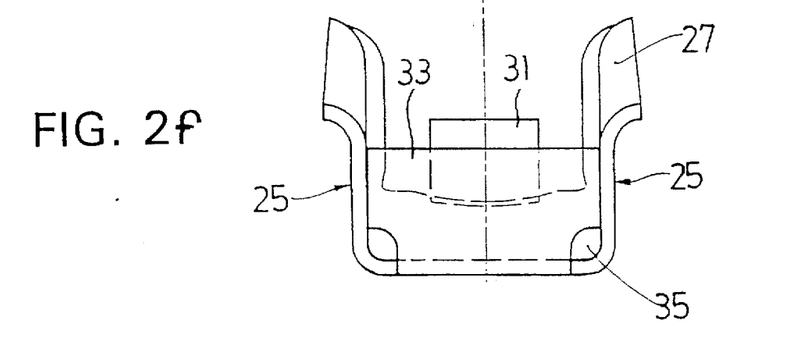

FIG. 2e shows a side view of one possible embodiment of the present invention wherein stop plate 31 is longer than the projecting portion 33. In addition, FIG. 4b shows an additional embodiment wherein the stop plate 31 is longer than the projecting portion 33.

In accordance with the embodiment shown in FIG. 2d, there can preferably be several angles (beta and beta$_1$), wherein angle beta corresponds to the arc length or angular extent of the cutout portion 29 of the bracket 17. Thus, cutout 29 can preferably have a contour which matches the contour of the container tube 9 and can extend over the container tube 9 about 90°. In addition, in accordance with one embodiment, angle beta$_1$ can correspond to the arc length of the stop plate 31, which stop plate 31 can extend over the container tube 9 about 60°.

In accordance with an alternative embodiment of the present invention, the projecting portion 33 can be longer than the stop plate 31, and it may be possible to use the projecting portion 33 as a clamping surface for a clamping tool in a welding jig.

FIGS. 3a–3d show additional embodiments of the decompression stop boundary bracket 17. The embodiments shown in FIGS. 3a–3d are essentially identical to the realization illustrated in FIGS. 2a–2c, except for a positive or interlocking connection between the projecting portion 33 and the two side walls 25, therefore, essentially only this difference is described below.

The positive or interlocking connection between the side walls 25 and the projecting portion 33 can include a notch or recess 37 formed in the side wall 25 and a lateral tab or extension 39 of the projecting portion 33. Each notch 37 is thereby worked into one end surface 41 of the side walls 25, while the tabs 39 are parts of the projecting portion 33. The notches 37 were quite deliberately worked into the side walls 25, because the projecting portion 33 of the base plate 23 is only deformed when the decompression stop boundary bracket 17 already has its U-shaped profile. During this deformation process, only a small bending angle (alpha) is necessary until the positive connection is created. Consequently, it is necessary to realize essentially no free stampings. It is important that the bending line 43 and the tab 39 lie parallel to one another or overlap, regardless of whether the tab 39 is a component of the side wall 25 or of the projecting portion 33.

In other words, and in accordance with one embodiment of the present invention, the bracket 17 can preferably be bent into a U-shaped profile to create base plate 23 and side walls 25. The projecting portion 33 can then be formed by bending a portion of base plate 23, and, if tabs 39 are located on the projecting portion 33, the tabs 39 can be forced into the recesses 37 of the side walls 25 at the same time that the projecting portion 33 is formed from the base plate 23 by bending.

In accordance with one embodiment of the present invention, the above-discussed tabs 39 can alternatively be part of the side walls 25, and the notches or recesses 37 can thus be made in the projecting portion 33, wherein the recesses 37 of the projecting portion 33 can be engaged with the tabs 39 of the side walls 25 when the projecting portion 33 is formed from the base plate 23 by bending, as discussed above.

Figure 3A:
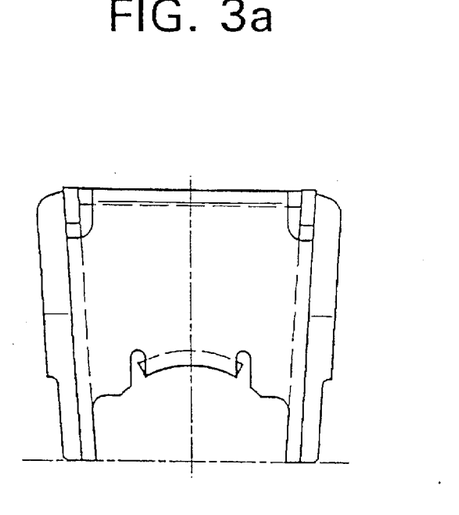
FIGS. 3a, 3b, 3c and 3d show additional embodiments of the decompression stop boundary bracket in isolation.
Figure 3B:
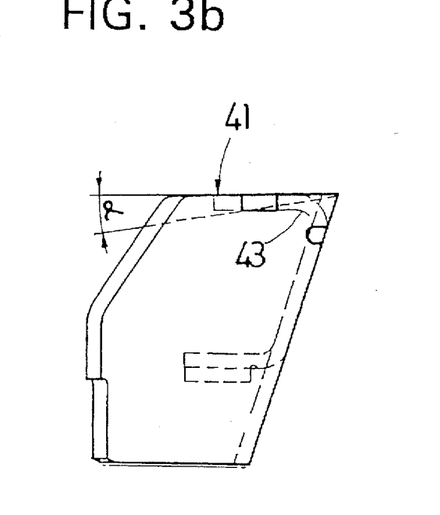
Figure 3C:
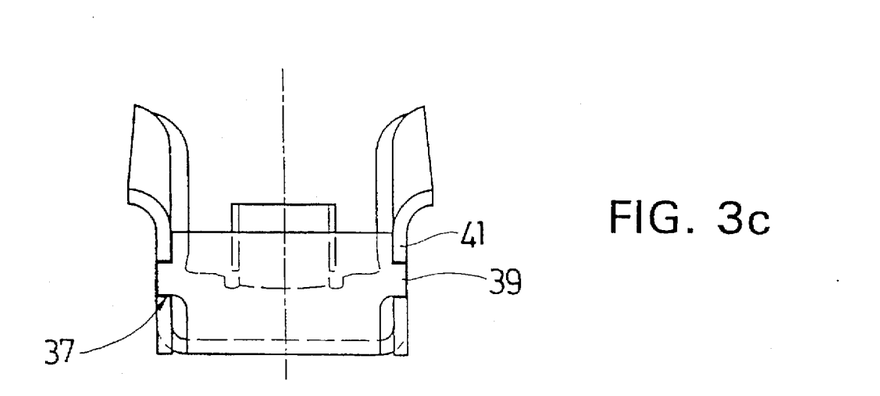
Figure 3D:
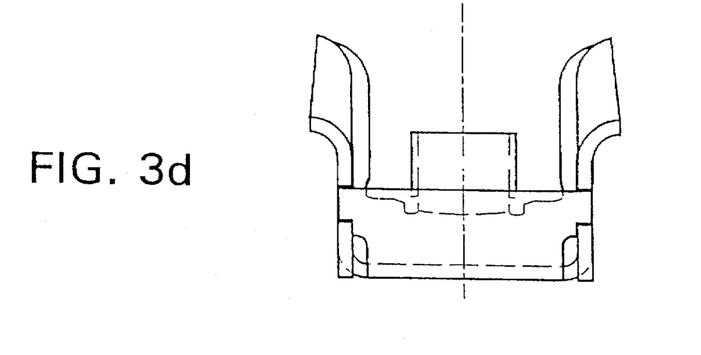

In the illustration of the decompression stop boundary bracket 17 shown in FIG. 3d, the tab 39 is adjacent to the top edge of the projecting portion 33, so that operations to create the tail-outs or cut-outs above the tabs 39, which are necessary in the embodiment illustrated in FIG. 3c, are essentially unnecessary.

Figure 3E:
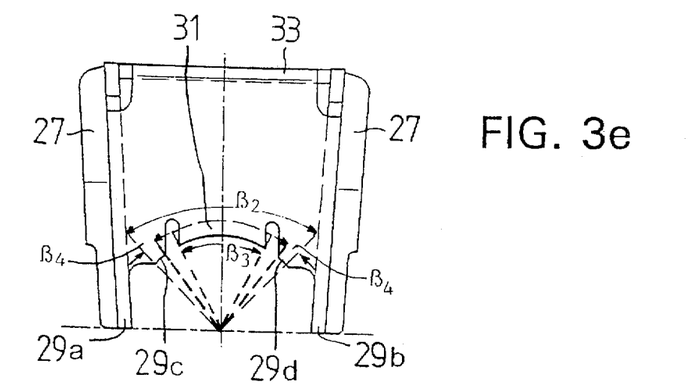
FIGS. 3e, 3f, 3g and 3h show similar views as that shown in FIGS. 3a-3d.
Figure 3F:
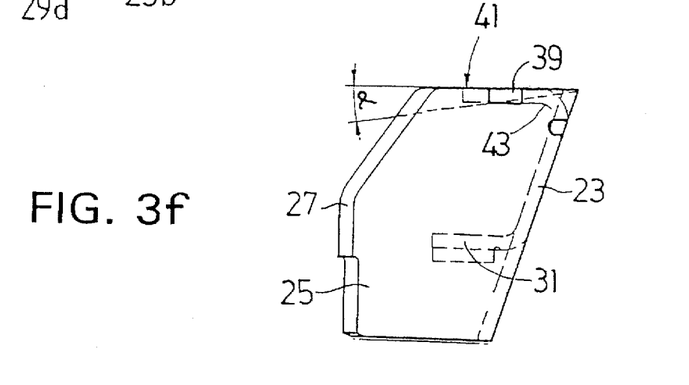
Figure 3G:
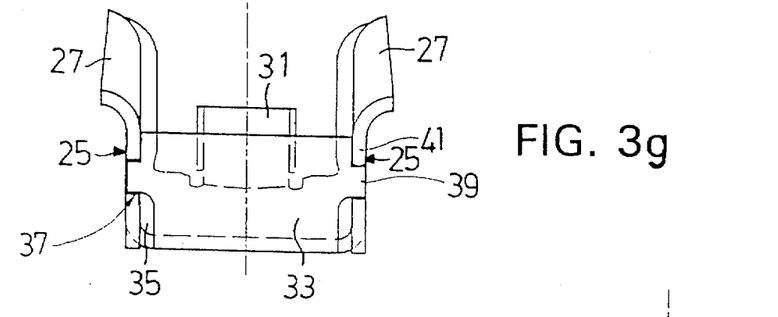
Figure 3H:
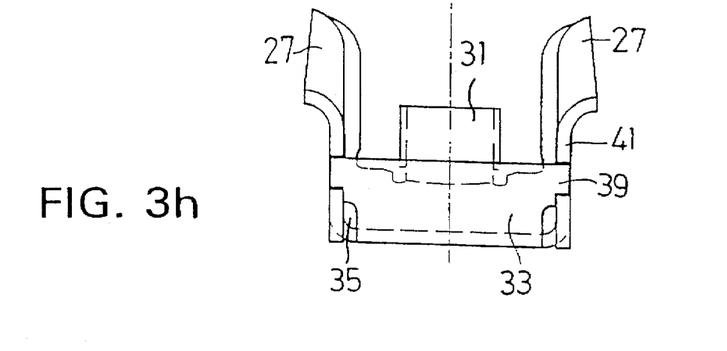

In accordance with the embodiment shown in FIG. 3e, the cutout 29 can preferably include two segments 29c and 29d which can have arc lengths corresponding to angle beta$_4$, which angle beta$_4$ has a value of about 10°. The two segments 29c and 29d can be separated from the stop plate 31 by a gap, on both sides of the stop plate 31. Further, the stop plate 31 can extend over the container tube 9 by about 60°, which corresponds to angle beta$_3$. Thus, the total angular extent of the cutout 29, including the angular extent of the stop plate 31, segments 29c and 29d, and the gaps formed between the stop plate 31 and the segments 29c and 29d, can be about 90° (which corresponds to angle beta$_2$).

Figure 4A:
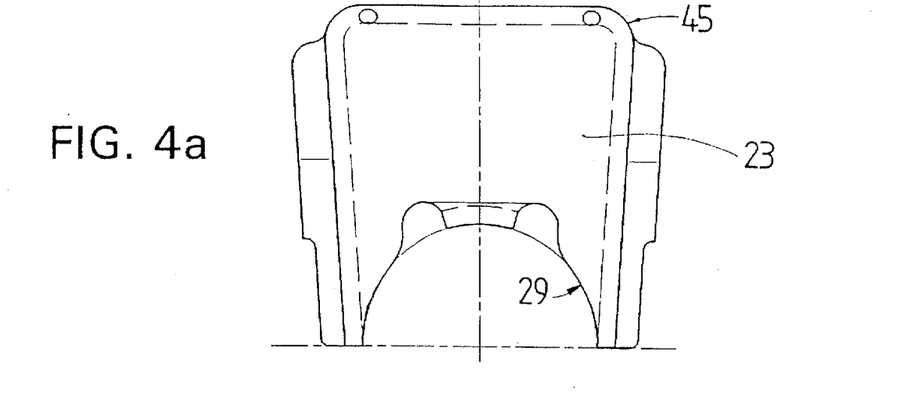
FIGS. 4a, 4b and 4c show an additional embodiment of the decompression stop boundary bracket in isolation.
Figure 4B:
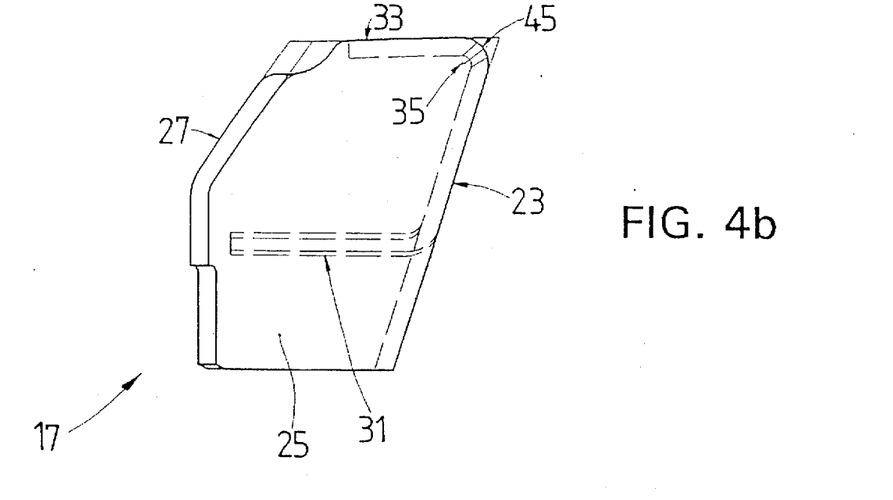
Figure 4C:
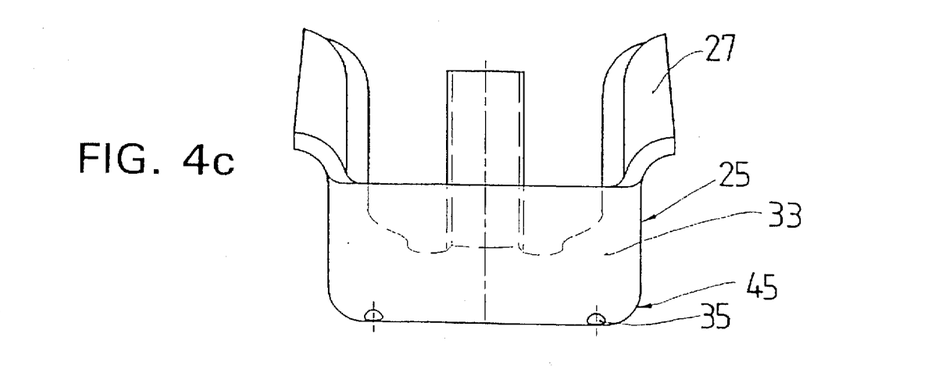

FIGS. 4a–4c show an additional embodiment which has been realized as a smoothly bent component. All the individual surfaces, such as the base plate 23, side walls 25, projecting portion 33 of the base plate 23 and also the stop plate 31, can preferably be manufactured from one piece of sheet metal, and after the deformation process, represent a one-piece, seamless component with no edges or butt joints. Tests have shown that this variant can withstand a significantly higher load, because there are no weld seams or even any positive connections in the component.

In accordance with one embodiment of the present invention, the stop plate 31 can preferably extend from the base plate 23 further than the projecting portion 33. That is, stop plate 31 can preferably have a greater length than the projecting portion 33, and can thereby provide a clamping surface for a clamping tool in a welding jig.

In accordance with one embodiment of the present invention, the embodiments shown in FIG. 4a–4f may be manufactured by deep drawing, examples of which can be found further below.

As described above with regard to FIGS. 2a–2c and 3a–3d, the variant illustrated in FIGS. 4a–4c also has openings 35 which, during the manufacturing process, allow cleaning fluids and excess paint to drain out of the decompression stop boundary bracket 17, and when the assembly has been installed in the vehicle, allow water to drain out of the decompression stop boundary bracket 17. The free stampings are introduced before the deformation to form the openings 35. To prevent the free stampings from "closing" during the deformation, the free stampings can be placed so that the openings 35 lie outside a transition radius 45 between the base plate 23, the side walls 25 and the projecting portion 33.

In other words, and in accordance with one embodiment, the transition radius 45 can coincide with the bent area between the projecting portion 33 and the base plate 23. When the projecting portion 33 is formed by bending a portion of the base plate 23, this bending will not close the openings 35 because the openings 35 are located away from this bent area. Alternatively, the openings 35 can be located in the bent portion having transition radius 45, if the openings 35 are large enough, or oversized, to prevent closure during the bending operation.

Figure 4D:
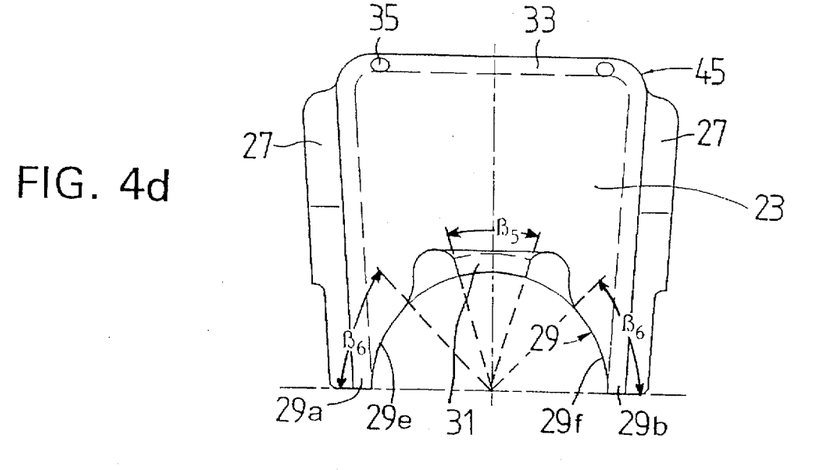
FIGS. 4d, 4e and 4f show similar views as that shown in FIGS. 4a and 4c.
Figure 4E:
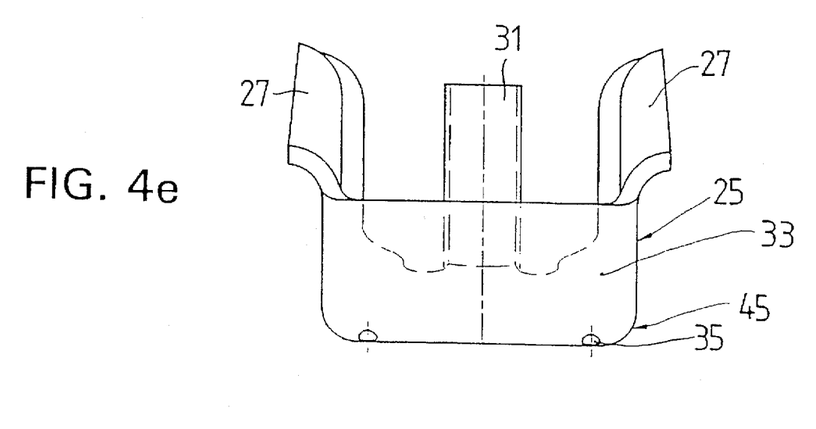
Figure 4F:
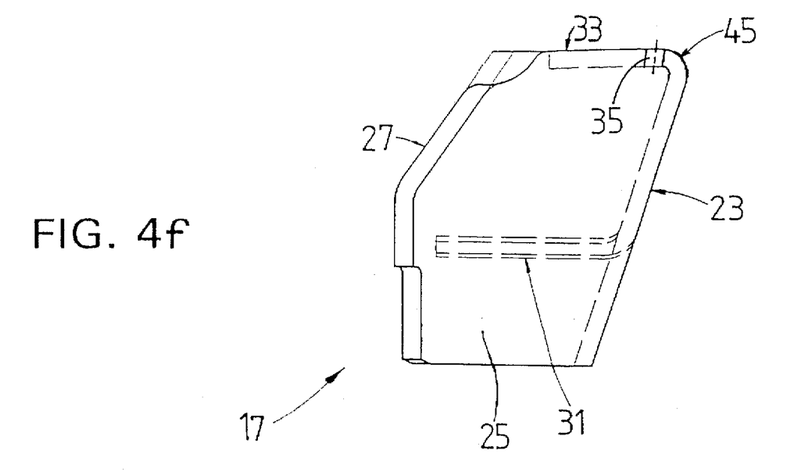

FIG. 4f shows an alternative embodiment of the present invention which can also be considered to have openings 35 disposed outside of the transition radius 45.

As shown in the embodiment of FIG. 4d, the stop plate 31 can have extend over the container tube 9 by an arc length of about 30°, which corresponds to angle $beta_5$. In addition, the cutout 29, in accordance with one embodiment, can have two segments 29e and 29f, which segments 29e and 29f can extend over the container tube 9 by an arc length of about 45°, which corresponds to angle $beta_6$. There can preferably be gaps between the stop plate 31 and the two segments 29e and 29f, that is, there can preferably be a gap on both sides of the stop plate 31. Thus, the total angular extent of the cutout 29, including the gaps, the stop plate 31 and the segments 29e and 29f, can be almost 180°.

One feature of the invention resides broadly in the vibration damper, in particular a shock absorbing strut, with an essentially U-shaped decompression stop boundary bracket, retainer or holder which is fastened to a container tube, and in the event of a rebound of a vehicle axle comes into contact with a chassis-side support surface, comprising a base plate with side walls, whereby the entire decompression stop boundary bracket is formed from a single bent component, characterized by the fact that the base plate 23 is realized in a seamless manner and has a cutout 29 which is adapted to the diameter of the container tube 9 and acts as a positioning stop for the entire decompression stop boundary bracket 17.

Another feature of the invention resides broadly in the vibration damper characterized by the fact that the base plate 23 in the blank state, with respect to the side walls 25, has a projecting portion or elongation 33 which runs in the direction of the longitudinal axis of the decompression stop 17, and in the finished part the base plate 23 is deformed so that the projecting portion 33 extends from the base plate 23 between the side walls 25.

Another feature of the invention resides broadly in the vibration damper characterized by the fact that the base plate 23 in the blank state, toward the side walls 25, has a projecting portion or elongation 33 toward the longitudinal axis of the decompression stop 17, and in the finished part the base plate 23 is deformed so that the projecting portion 33 extends from the base plate 23 between the side walls 25.

Yet another feature of the invention resides broadly in the vibration damper characterized by the fact that there is a positive or interlocking connection between the projecting portion 33 and the side walls 25.

Still another feature of the invention resides broadly in the vibration damper characterized by the fact that the positive connection is formed by a notch or recess 37 of a connecting part and a corresponding tab or extension 39 of the other connecting part.

A further feature of the invention resides broadly in the vibration damper characterized by the fact that a portion of the positive connection is realized in an end surface 41 of the ends of the side walls 25, i.e. the ends which lie in the axial direction.

Another feature of the invention resides broadly in the vibration damper characterized by the fact that the projecting portion 33 of the base plate 23 is realized on the end opposite the container tube 9.

Yet another feature of the invention resides broadly in the vibration damper characterized by the fact that the base plate 23 has a stop plate 31 which is also a component of the one-piece decompression stop boundary bracket 17.

Still another feature of the invention resides broadly in the vibration damper characterized by the fact that the stop plate 31, beginning from the base plate 23, is longer than the projecting portion 33 between the side walls 25.

A further feature of the invention resides broadly in the vibration damper characterized by the fact that the entire decompression stop boundary bracket 17 is realized in the form of a smoothly shaped bent component having flow holes 35.

Another feature of the invention resides broadly in the vibration damper characterized by the fact that there are free stampings or clearance cuts for the transformation of the decompression stop boundary bracket 17, which free stampings are realized outside a transitional radius 45 which connects the base plate 23, the side wall 25 and the projecting portion 33.

Examples of shock absorbers, which may be utilized in accordance with the embodiments of the present invention, may be found in the following U.S. Patents: U.S. Pat. No. 4,669,586 to Mettler, entitled "Pipe-Type Housing for a Shock Absorber Particularly of the Telescopic Vibration Damper Type"; U.S. Pat. No. 4,660,436 to Davoust and Pelus, entitled "Viscous Vibration Dampers"; and U.S. Pat. No. 3,901,359 to Jentsch, entitled "Hydraulic Twin-Tube Vibration Damper".

Methods of deep drawing which may be used to form various components of the present invention may be found in the following U.S. patents: U.S. Pat. No. 4,532,793 to Helmut on Aug. 6, 1985, entitled "Method for Deep-drawing Sheet Metal and an Apparatus for Carrying Out the Method"; U.S. Pat. No. 4,414,836 to Saunders on Nov. 15, 1983, entitled "Method of and Apparatus for Deep Drawing Metal Containers"; U.S. Pat. No. 4,290,293 to Selines on Sep. 22, 1981, entitled "Method for Deep Drawing"; and U.S. Pat. No. 4,354,370 to Ullman on Oct. 19, 1982, entitled "Method for Deep Drawing Sheet Metal".

Examples of MacPherson struts, which may be utilized in accordance with the embodiments of the present invention, may be found in the following U.S. Patents: U.S. Pat. No. 4,944,524 (Jul. 31, 1990); and U.S. Pat. No. 4,477,061 (Oct. 16, 1984).

Examples of automatic welding arrangements, which may be utilized in accordance with the embodiments of the present invention, may be found in the following U.S. Patents: U.S. Pat. No. 4,377,024, which issued to Saperstein on Mar. 22, 1983; U.S. Pat. No. 4,229,641, which issued to Ihara on Oct. 21, 1980; U.S. Pat. No. 4,213,555, which issued to Minkiewicz et al. on Jul. 22, 1980; U.S. Pat. No. 4,112,289, which issued to Mead et al. on Sep. 5, 1978; and U.S. Pat. No. 3,964,665, which issued to Cervenka et al. on Jun. 22, 1976.

Examples of jig arrangements for automatic welding, which may be utilized in accordance with the embodiments of the present invention, may be found in the following U.S. Patents: U.S. Pat. No. 4,667,866, which issued to Tobita et al. on May 26, 1987; U.S. Pat. No. 4,593,850, which issued to Ariga et al. on Jun. 10, 1986; and U.S. Pat. No. 4,400,607, which issued to Wakou et al. on Aug. 23, 1983.

Examples of brackets which may have components which may be utilized in accordance with the present invention may be found in the following U.S. Patents: U.S. Pat. No. 4,261,446, which issued to Bolger on Apr. 14, 1981; U.S. Pat. No. 5,228,717, which issued to Perkins on Jul. 20, 1993; U.S. Pat. No. 5,227,357, which issued to Miyamoto et al. on Jan. 11, 1994; U.S. Pat. No. 5,308,032, which issued to Ohta on May 3, 1994; U.S. Pat. No. 5,350,044, which issued to Gelhausen on Sep. 27, 1994; U.S. Pat. No. 5,401,051, which issued to Ivory on Mar. 28, 1995; U.S. Pat. No. 5,423,403, which issued to Handke et al. on Jun. 13, 1995; and U.S. Pat. No. 4,363,436, which issued to Evans et al. on Dec. 14, 1982.

Examples of metal forming, tolerances, and methods of metal working which may be utilized in accordance with the present invention are disclosed in the following publications: "Mechanical Working and Steel Processing", Proceedings of the 28th Conference of the Metallurgical Society and AIME, 1986, published by Gordon and Breach Publishers, New York, N.Y.; and "Metal Forming: Interrelation Between Theory and Practice", 1970 Conference of AIME, A. L. Hoffmanner, Plenum Press, New York, N.Y.

U.S. patent application Ser. No. 08/263,773, having inventors Günther Handke and Andreas Zietsch, filed on Jun. 22, 1994, which issued as U.S. Pat. No. 5,672,242, on Apr. 22, 1997, and Federal Republic of Germany Patent Application No. 43 21 036 filed on Jun. 24, 1993, from which application Ser. No. 08/263,773 claims priority, are hereby incorporated by reference herein.

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 47 591.7-21, filed on Dec. 20, 1995, having inventors Günther Handke, Andreas Zietsch, Michael Hurrlein, and DE-OS 195 47 591.7-21 and DE-PS 195 47 591.7-21, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper, comprising:

a first end and a second end;

a container tube disposed between said first end and said second end;

said first end comprising means for connecting said vibration damper to a first body;

said second end comprising means for connecting said vibration damper to a second body;

said container tube having an external surface;

said container tube defining a circumference at said external surface;

said external surface having a contour extending along the circumference of said container tube;

a chamber defined within said container tube, said chamber containing a damping fluid;

a piston rod sealingly projecting into said chamber and being axially displaceable with respect to said container tube;

a piston attached to said piston rod, said piston being disposed within said chamber to sealingly divide said chamber into first and second chambers;

means for permitting fluid communication between said first and second chambers;

said vibration damper defining a central longitudinal axis, the central longitudinal axis defining an axial direction of said vibration damper;

a bracket extending outwardly from said container tube in a generally radial direction with respect to the longitudinal axis, said bracket being welded to said container tube by at least one weld;

said at least one weld being disposed to fasten said bracket to said container tube;

said bracket being disposed for striking an external object to cease axial displacement of at least a portion of said vibration damper;

said bracket comprising a plurality of bends;

said plurality of bends being configured and disposed to permit said bracket, prior to said bracket being welded to said container tube, to be formed without welding to thus maximize stability of said bracket;

said bracket comprising:
 a base plate, said base plate comprising means for positioning said bracket with respect to said external surface of said container tube;
 said positioning means comprising a portion of said base plate disposed adjacent said external surface of said container tube, said portion of said base plate extending over a portion of the circumference of said container tube; and
 said portion of said base plate having a contour, said contour of said portion substantially matching, to a close tolerance, said contour of said external surface of said container tube along a substantial portion of said external surface of said container tube.

2. The vibration damper according to claim 1 wherein:

said contour of said portion is formed from a cutout piece of said base plate.

3. The vibration damper according to claim 2 wherein:

said portion of said base plate is disposed immediately adjacent said external surface of said container tube;

said contour of said portion of said base plate matches said contour of said external surface of said container tube; and said base plate is configured in a seamless manner.

4. The vibration damper according to claim 3 wherein:

said base plate has-a first edge portion and a second edge portion disposed substantially parallel to one another;

said bracket comprises a first side wall and a second side wall disposed substantially parallel with respect to one another, said first side wall extending from said first edge portion of said base plate and said second side wall extending from said second edge portion of said base plate; and said first side wall and said second side wall both being integral with said base plate.

5. The vibration damper according to claim 4 wherein:

said base plate has a third edge portion extending between said first edge portion and said second edge portion, said third edge portion being substantially perpendicular with respect to both of said first edge portion and said second edge portion;

said bracket comprises a projecting portion extending from said third edge portion of said base plate, said projecting portion being disposed substantially perpendicular with respect to both of said first side wall and said second side wall;

said projecting portion being disposed between said first side wall and said second side wall and being disposed substantially parallel with respect to the longitudinal axis of said container tube; and said projecting portion being integral with said base plate.

6. The vibration damper according to claim 5 wherein:

said base plate has a fourth edge portion disposed adjacent said container tube, said fourth edge portion extending between said first edge portion and said second edge portion;

said fourth edge portion comprising said portion of said base plate having said contour;

said fourth edge portion being disposed opposite said third edge portion; and said projecting portion being disposed a substantial distance from said container tube.

7. The vibration damper according to claim 6 wherein:

said positioning means comprises a stop portion extending axially from said fourth edge portion of said base plate, said stop portion being integral with said base plate;

said stop portion extending along said external surface of said container tube and being disposed immediately adjacent said external surface of said container tube; and said stop portion comprises a contour, said contour of said stop portion matching said contour of said container tube and matching said contour of said portion of said base plate.

8. The vibration damper according to claim 7 wherein said bracket comprises means for connecting said projecting portion to at least one of said first side wall and said second side wall in an interlocking manner.

9. The vibration damper according to claim 8 wherein said connecting means comprises:

at least one tab disposed on one of:
said projecting portion; and
one of said first side wall and said second side wall; and at least one recess disposed in the other one of:
said projecting portion; and
said one of said first side wall and said second side wall.

10. The vibration damper according to claim 9 wherein:

each of said first side wall and said second side wall have an edge disposed substantially parallel with respect to the longitudinal axis of said container tube, each of said edges being disposed adjacent said third edge portion of said base plate;

said projecting portion has a first side and a second side disposed substantially parallel to one another, said first side of said projecting portion corresponding to said edge of said first side wall and said second side of said projecting portion corresponding to said edge of said second side wall;

one of said edges of said first side wall and said second side wall comprises one of:
said at least one tab; and
said at least one recess;

the corresponding one of said first and said second sides of said projecting portion comprises the other one of:
said at least one tab; and
said at least one recess.

11. The vibration damper according to claim 10 wherein:

each of said first and second side walls comprises a collar extending away from said first and second side walls;

said first and second side walls each comprise an additional edge disposed parallel with respect to the longitudinal axis, said additional edges being disposed opposite of said edges of said first and second side walls;

said first side wall comprises a first extension and said second side wall comprises a second extension, said first extension being disposed on said additional edge of said first side wall and said second extension being disposed on said additional edge of said second side wall;

said first extension and said second extension being disposed adjacent said fourth edge portion of said base plate and being welded to said container tube;

said projecting portion has a third side and a fourth side, each of said third side and said fourth side extending between said first and second sides of said projecting portion;

said third side of said projecting portion being disposed adjacent said collars of said first and second side walls, said fourth side of said projecting portion being disposed adjacent said base plate;

said at least one tab comprises two tabs, said two tabs being a first tab and a second tab;

said first tab being disposed on said first side of said projecting portion;

said second tab being disposed on said second side of said projecting portion;

said first tab and said second tab being disposed at one of:
immediately adjacent said third side of said projecting portion; and between said third side and said fourth side of said projecting portion;

said at least one recess comprises two recesses, said two recesses being a first recess and a second recess;

said first recess being disposed in said edge of said first side wall;

said second recess being disposed in said edge of said second side wall;

said first tab being engaged in said first recess;

said second tab being engaged in said second recess; and said bracket comprises two holes, said two holes being disposed adjacent said fourth side of said projecting portion and being disposed to permit discharge of fluid from said bracket.

12. The vibration damper according to claim 7 wherein:

said projecting portion has a length defined substantially parallel to the longitudinal axis of said container tube;

said stop portion has a length defined substantially parallel to the longitudinal axis of said container tube, the length of said stop portion being substantially greater than the length of said projecting portion;

said bracket comprises a bent portion disposed between each of said first and second side walls and said base plate and between said first and second side walls and said projecting portion, said bent portion forming a transition between said first and second side walls, said projecting portion and said base plate;

said bracket comprises a smoothly shaped bent component, said smoothly shaped bent component comprising at least one hole disposed to permit fluid to exit said bracket;

said at least one hole being disposed a substantial distance from said bent portion;

each of said first and second side walls comprises a collar extending away from said first and second side walls;

said first side wall comprises a first extension and said second side wall comprises a second extension; and said first extension and said second extension being disposed adjacent said fourth edge portion of said base plate and being welded to said container tube.

13. The vibration damper according to claim 7 wherein:

each of said first and second side walls comprises a collar extending away from said first and second side walls;

said first and second side walls each comprise an edge disposed substantially parallel with respect to the longitudinal axis of said container tube, each of said edges being disposed adjacent said third edge portion of said base plate;

said projecting portion comprises a first side and a second side disposed substantially parallel to one another, said first side of said projecting portion engaging with said edge of said first side wall and said second side of said projecting portion engaging with said edge of said second side wall;

said first and second side walls each comprise an additional edge disposed substantially parallel with respect to the longitudinal axis, said additional edges being disposed opposite of said edges of said first and second side walls;

said first side wall a first extension and said second side wall comprises a second extension, said first extension being disposed on said additional edge of said first side wall and said second extension being disposed on said additional edge of said second side wall;

said first extension and said second extension being disposed adjacent said fourth edge portion of said base plate and being welded to said container tube; and said bracket comprises two holes, said two holes being disposed in said projecting portion adjacent said fourth edge portion of said base plate and being disposed to permit fluid to exit said bracket.

14. A vibration damper, comprising:

a first end and a second end;

a container tube disposed between said first end and said second end;

said first end comprising means for connecting said vibration damper to a first body;

said second end comprising means for connecting said vibration damper to a second body;

said container tube having an external surface, said external surface having a contour extending along said container tube;

a chamber defined within said container tube, said chamber containing a damping fluid;

a piston rod sealingly projecting into said chamber and being axially displaceable with respect to said container tube;

a piston attached to said piston rod, said piston being disposed within said chamber to sealingly divide said chamber into first and second chambers;

means for permitting fluid communication between said first and second chambers;

said vibration damper defining a central longitudinal axis, the central longitudinal axis defining an axial direction of said vibration damper;

a bracket welded to said container tube by at least one weld and extending outwardly from said container tube generally transversely with respect to the longitudinal axis;

said at least one weld being disposed to fasten said bracket to said container tube;

said bracket being disposed for striking an external object to cease axial displacement of said at least a portion of said vibration damper;

said bracket comprising:
  said bracket comprising a plurality of bends;
  said plurality of bends being configured and disposed to permit said bracket, prior to said bracket being welded to said container tube, to be formed without welding to thus maximize stability of said bracket;
  means for positioning said bracket with respect to said external surface of said container tube;
  said positioning means comprising a portion of said bracket disposed adjacent said external surface of said container tube, said portion of said bracket extending over a portion of said external surface of said container tube; and
  said portion of said bracket having a contour, said contour of said portion substantially matching said contour of said external surface of said container tube along a substantial portion of said external surface of said container tube.

15. The vibration damper according to claim 14 wherein:

said portion of said bracket is disposed immediately adjacent said external surface of said container tube;

said contour of said portion of said bracket matches said contour of said external surface of said container tube;

said bracket comprises a base plate, said base plate comprising said portion of said bracket having said contour; and said base plate is configured in a seamless manner.

16. The vibration damper according to claim 15 wherein:

said base plate has a first edge portion and a second edge portion disposed substantially parallel to one another;

said bracket comprises a first side wall and a second side wall disposed substantially parallel with respect to one another, said first side wall extending from said first edge portion of said base plate and said second side wall extending from said second edge portion of said base plate;

said first side wall and said second side wall both being integral with said base plate;

said base plate has a third edge portion extending between said first edge portion and said second edge portion, said third edge portion being substantially perpendicular with respect to both of said first edge portion and said second edge portion;

said bracket comprises a projecting portion extending from said third edge portion of said base plate, said projecting portion being disposed substantially perpendicular with respect to both of said first side wall and said second side wall;

said projecting portion being disposed between said first side wall and said second side wall and being disposed substantially parallel with respect to the longitudinal axis of said container tube;

said projecting portion being integral with said base plate;

said base plate has a fourth edge portion disposed adjacent said container tube, said fourth edge portion extending between said first edge portion and said second edge portion;

said fourth edge portion comprising said portion of said bracket having said contour;

said fourth edge portion being disposed opposite said third edge portion; and said projecting portion being disposed a substantial distance from said container tube.

17. The vibration damper according to claim 16 wherein:

said positioning means comprises a stop portion extending axially from said fourth edge portion of said base plate, said stop portion being integral with said base plate;

said stop portion extending along said external surface of said container tube and being disposed immediately adjacent said external surface of said container tube; and said stop portion comprises a contour, said contour of said stop portion matching said contour of said container tube and said contour of said portion of said bracket.

18. The vibration damper according to claim 17 wherein:

said bracket comprises means for connecting said projecting portion to at least one of said first side wall and said second side wall in an interlocking manner;

said connecting means comprises:

at least one tab disposed on one of:

said projecting portion; and one of said first side wall and said second side wall; and at least one recess disposed in the other one of:

said projecting portion; and said one of said first side wall and said second side wall.

19. A method of making a vibration damper, said vibration damper comprising: a first end and a second end; a container tube disposed between said first end and said second end; said first end comprising means for connecting said vibration damper to a first body; said second end comprising means for connecting said vibration damper to a second body; said container tube having an external surface; said container tube defining a circumference at said external surface; said external surface having a contour extending along the circumference of said container tube; a chamber defined within said container tube, said chamber containing a damping fluid; a piston rod sealingly projecting into said chamber and being axially displaceable with respect to said container tube; a piston attached to said piston rod, said piston being disposed within said chamber to sealingly divide said chamber into first and second chambers; means for permitting fluid communication between said first and second chambers; said vibration damper defining a central longitudinal axis, the central longitudinal axis defining an axial direction of said vibration damper; a bracket extending outwardly from said container tube in a generally radial direction with respect to the longitudinal axis; said bracket being disposed for striking an external object to cease axial displacement of said at least a portion of said vibration damper; said bracket comprising: a base plate, said base plate comprising means for positioning said bracket with respect to said external surface of said container tube; said positioning means comprising a portion of said base plate disposed adjacent said external surface of said container tube, said portion of said base plate extending over a portion of the circumference of said container tube; and said portion of said positioning means having a contour, said contour of said portion substantially matching, to a close tolerance, said contour of said external surface of said container tube along a substantial portion of said external surface of said container tube; said method comprising the steps of:

providing a container tube;

providing means for connecting the vibration damper to a first body;

providing means for connecting the vibration damper to a second body;

providing a piston rod;

providing a piston;

providing means for permitting fluid communication;

providing a bracket;

providing the bracket with means for limiting axial displacement of at least a portion of said vibration damper;

said method further comprising:

configuring the container tube to have an external surface, the container tube defining a circumference at the external surface;

configuring the external surface of the container tube to have a contour extending along the circumference of the container tube;

configuring the bracket to have a plurality of bends;

configuring the bracket to have a base plate;

configuring the base plate to have means for positioning the bracket with respect to the external surface of the container tube;

configuring the container tube to have a chamber;

adding damping fluid to the chamber of the container tube;

attaching the piston to the piston rod;

disposing the piston rod to sealingly project into said chamber and so as to be axially displaceable with respect to said container tube and disposing said piston within said chamber to sealingly divide said chamber into first and second chambers;

cutting out a piece of the base plate to form a contour of the portion of the base plate;

bending the bracket with the plurality of bends to form the operational shape of the bracket without welding;

substantially matching said contour of said portion, to a close tolerance, with said contour of said external surface of said container tube along a substantial portion of said external surface of said container tube;

disposing the bracket at said container tube, the bracket extending outwardly from said container tube in a generally radial direction with respect to the longitudinal axis;

positioning the base plate with respect to said external surface of said container tube, with the means for positioning;

positioning the base plate with respect to the external surface of the container tube by disposing said portion of said bracket adjacent said external surface of said container tube such that said portion of said base plate extends over a portion of the circumference of said container tube; and welding said bracket to said container tube with at least one weld.

20. The method according to claim 19 further comprising:

forming said base plate in a seamless manner;

forming a first side wall and a second side wall from the base plate by bending portions of the base plate;

disposing the first side wall and the second side wall substantially parallel to one another;

forming a projecting portion from the base plate by bending an additional portion of the base plate; and disposing the projecting portion between the first side wall and the second side wall to reinforce the first side wall and the second side wall.

* * * * *